US012592644B2

(12) United States Patent
Chen et al.

(10) Patent No.: US 12,592,644 B2
(45) Date of Patent: Mar. 31, 2026

(54) RESONANT FLYBACK POWER CONVERTER AND SWITCHING CONTROL CIRCUIT AND METHOD THEREOF

(71) Applicant: Richtek Technology Corporation, Zhubei City (TW)

(72) Inventors: Yu-Chang Chen, Nanto (TW); Ta-Yung Yang, Taoyuan (TW); Kun-Yu Lin, Hsinchu (TW); Fu-Ciao Syu, New Taipei (TW); Chia-Hsien Yang, Keelung (TW); Hsin-Yi Wu, Hsinchu (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 362 days.

(21) Appl. No.: 18/335,195

(22) Filed: Jun. 15, 2023

(65) Prior Publication Data

US 2024/0128876 A1     Apr. 18, 2024

Related U.S. Application Data

(63) Continuation-in-part of application No. 18/298,340, filed on Apr. 10, 2023, now Pat. No. 12,407,264.

(60) Provisional application No. 63/383,709, filed on Nov. 15, 2022, provisional application No. 63/379,771, filed on Oct. 17, 2022.

(51) Int. Cl.
*H02M 3/335*        (2006.01)
*H02M 1/08*         (2006.01)

(52) U.S. Cl.
CPC ....... *H02M 3/33507* (2013.01); *H02M 1/083* (2013.01)

(58) Field of Classification Search
CPC ............. H02M 3/33507; H02M 1/083; H02M 1/0009; H02M 1/08; H02M 1/0032; H02M 3/01; H02M 3/33571; H02M 1/0058
See application file for complete search history.

(56)                References Cited

U.S. PATENT DOCUMENTS

| | | | | |
|---|---|---|---|---|
| 11,962,247 | B2 * | 4/2024 | Yang ................... | H02M 1/0058 |
| 12,273,028 | B2 * | 4/2025 | Yang ................... | H02M 1/083 |
| 12,273,038 | B2 * | 4/2025 | Chen .................. | H02M 1/0058 |
| 2004/0140792 | A1 † | 7/2004 | Abdoulin | |
| 2009/0040792 | A1 * | 2/2009 | Yang ................ | H02M 3/33592 363/21.06 |

(Continued)

*Primary Examiner* — Kyle J Moody
(74) *Attorney, Agent, or Firm* — Tung & Associates

(57)                ABSTRACT

A switching control circuit for use in controlling a resonant flyback power converter generates a first driving signal and a second driving signal. The first driving signal is configured to turn on the first transistor to generate a first current to magnetize a transformer and charge a resonant capacitor. The transformer and charge a resonant capacitor are connected in series. The second driving signal is configured to turn on the second transistor to generate a second current to discharge the resonant capacitor. During a power-on period of the resonant flyback power converter, the second driving signal includes a plurality of short-pulses configured to turn on the second transistor for discharging the resonant capacitor. A pulse-width of the short-pulses of the second driving signal is short to an extent that the second current does not exceed a current limit threshold.

26 Claims, 13 Drawing Sheets

(56)         References Cited

U.S. PATENT DOCUMENTS

2009/0091951 A1 *    4/2009   Yang ................. H02M 3/33592
                                                    363/21.06
2011/0164437 A1 †    7/2011   Sun
2015/0318778 A1 †   11/2015   Gong \* cited by examiner
† cited by third party Tres_min= TW1 + TW2

Tres_min= TW1 + 0

2010

RESONANT FLYBACK POWER CONVERTER AND SWITCHING CONTROL CIRCUIT AND METHOD THEREOF

CROSS REFERENCE

The present invention is a Continuation-In-Part (CIP) application of the patent application Ser. No. 18/298,340, filed on Apr. 10, 2023. The present invention claims priority to provisional application Ser. No. 63/379,771, filed on Oct. 17, 2022; provisional application Ser. No. 63/383,709, filed on Nov. 15, 2022; all of which applications are incorporated herein by their reference in their entirety.

BACKGROUND OF THE INVENTION

Field of Invention

The present invention relates to a resonant flyback power converter; particularly, it relates to a resonant flyback power converter which can avoid over-current during the power-on period. The present invention also relates to switching control circuit and a method for controlling the resonant flyback power converter.

Description of Related Art

FIG. 1A illustrates a prior art resonant flyback power converter with zero voltage switching (ZVS) for achieving the high power-efficiency. FIG. 1B illustrates operating waveforms corresponding to the resonant flyback power converter shown in FIG. 1A. As shown in FIG. 1B, during the power-on period TonW, the second driving signal SL is turned on for a long time for discharging possible residue charge stored on the resonant capacitor. However, the negative current IPN will become too large in this prior art.

Therefore, to overcome the aforementioned drawback of the prior art half-bridge flyback power converter, the present invention provides a resonant flyback power converter having high efficiency in light load and capable of preventing over-current protection during the power-on period, a switching control circuit therein and a method thereof.

SUMMARY OF THE INVENTION

In one perspective, the present invention provides a switching control circuit for use in controlling a resonant flyback power converter which includes a first transistor and a second transistor which form a half-bridge circuit; and a transformer and a resonant capacitor which are connected in series and are coupled to the half-bridge circuit, wherein the half-bridge circuit is configured to switch the transformer and the resonant capacitor to generate an output voltage; wherein the switching control circuit comprises: a magnetizing control circuit, configured to operably generate a first driving signal to switch the first transistor; and a resonant and ZVS control circuit, coupled to the magnetizing control circuit and configured to operably generate a second driving signal to switch the second transistor; wherein the switching control circuit is configured to turn on the first transistor to generate a first current to magnetize the transformer and charge the resonant capacitor, and is configured to turn on the second transistor to generate a second current to discharge the resonant capacitor; wherein during a power-on period of the resonant flyback power converter, the switching control circuit generates a plurality of short-pulses of the second driving signal to turn on the second transistor for discharging the resonant capacitor.

In one preferred embodiment, a pulse-width of the short-pulses of the second driving signal is short to an extent that the second current does not exceed a current limit threshold.

In one preferred embodiment, the pulse-width of the short-pulses of the second driving signal is less than 1 µs.

In one preferred embodiment, the first driving signal is turned off during the power-on period of the resonant flyback power converter.

In one preferred embodiment, the switching control circuit further includes a feedback circuit to control the first driving signal and the second driving signal for regulating the output voltage; wherein the feedback loop of the feedback circuit is controlled to be open-looped during the power-on period of the resonant flyback power converter.

In one preferred embodiment, the first driving signal and the second driving signal are turned off when the level of the second current is over a negative-over-current threshold.

In one preferred embodiment, the first current and the second current are in inverse polarity.

In one preferred embodiment, a blank time between two consecutive ones of the short-pulses is long to an extent that the second current does not exceed a current limit threshold.

In one preferred embodiment, the switching control circuit further includes a counter configured to count the blank time.

In one preferred embodiment, the first driving signal is turned on with a minimum pulse-width after turning-off of at least one of the short-pulses of the second driving signal during the power-on period of the resonant flyback power converter.

In one preferred embodiment, the pulse-width of the short-pulses of the second driving signal is related to a capacitance of the resonant capacitor, a capacitance of the output capacitor, and/or an SOA of the second transistor.

In one preferred embodiment, the short-pulses of the second driving signal are further configured to charge a bootstrap capacitor, wherein the bootstrap capacitor is configured to provide a power source to a high-side gate driver for generating the first driving signal to drive the first transistor.

In another perspective, the present invention provides a resonant flyback power converter, comprising: a first transistor and a second transistor which form a half-bridge circuit; a transformer and a resonant capacitor which are connected in series and are coupled to the half-bridge circuit; and a switching control circuit configured to operably generate a first driving signal and a second driving signal to control the first transistor and the second transistor respectively for switching the transformer and the resonant capacitor to generate an output voltage; wherein the switching control circuit is configured to turn on the first transistor to generate a first current to magnetize the transformer and charge the resonant capacitor, and is configured to turn on the second transistor to generate a second current to discharge the resonant capacitor; wherein during a power-on period of the resonant flyback power converter, the switching control circuit generates a plurality of short-pulses of the second driving signal to turn on the second transistor for discharging the resonant capacitor.

In another perspective, the present invention provides a method for use in controlling a resonant flyback power converter which includes a first transistor and a second transistor which form a half-bridge circuit; and a transformer and a resonant capacitor which are connected in series and are coupled to the half-bridge circuit, wherein the half-bridge circuit is configured to switch the transformer and the resonant capacitor to generate an output voltage; wherein the method comprises: generating a first driving signal which is configured to turn on the first transistor to generate a first current to magnetize the transformer and charge the resonant capacitor; and generating a second driving signal which is configured to turn on the second transistor to generate a second current to discharge the resonant capacitor; wherein during a power-on period of the resonant flyback power converter, the second driving signal includes a plurality of short-pulses configured to turn on the second transistor for discharging the resonant capacitor.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
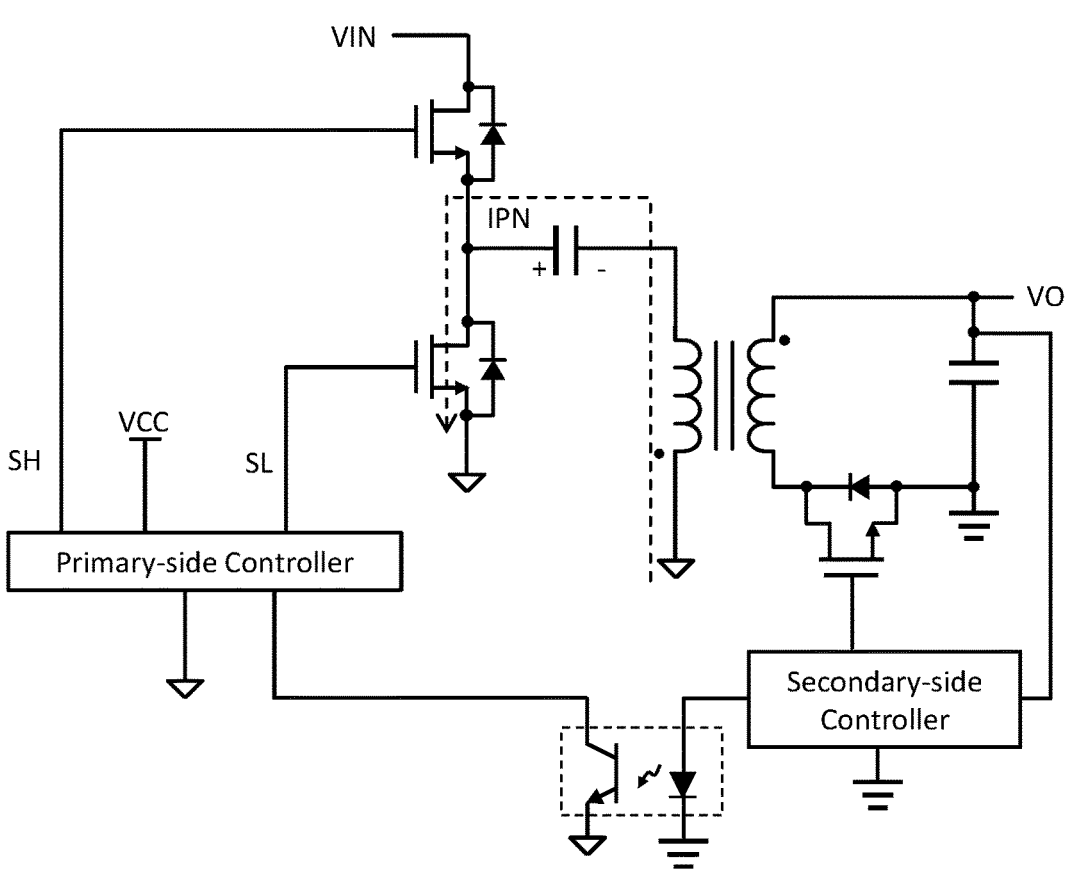
FIG. 1A illustrates a prior art resonant flyback power converter with zero voltage switching (ZVS) for achieving the high power-efficiency.
Figure 1B:
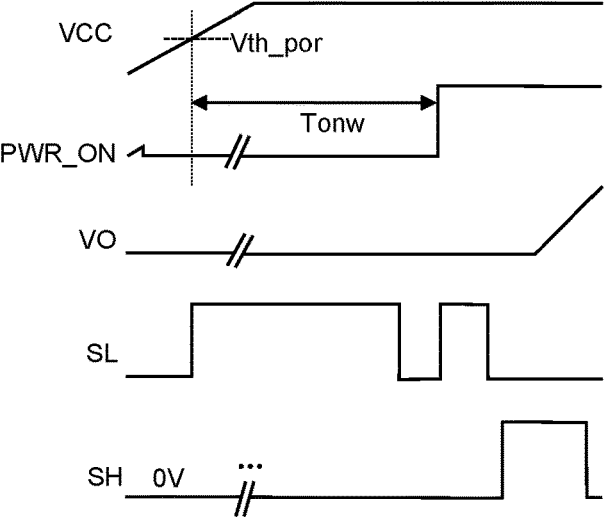
FIG. 1B illustrates operating waveforms corresponding to the resonant flyback power converter shown in FIG. 1A.
Figure 2:
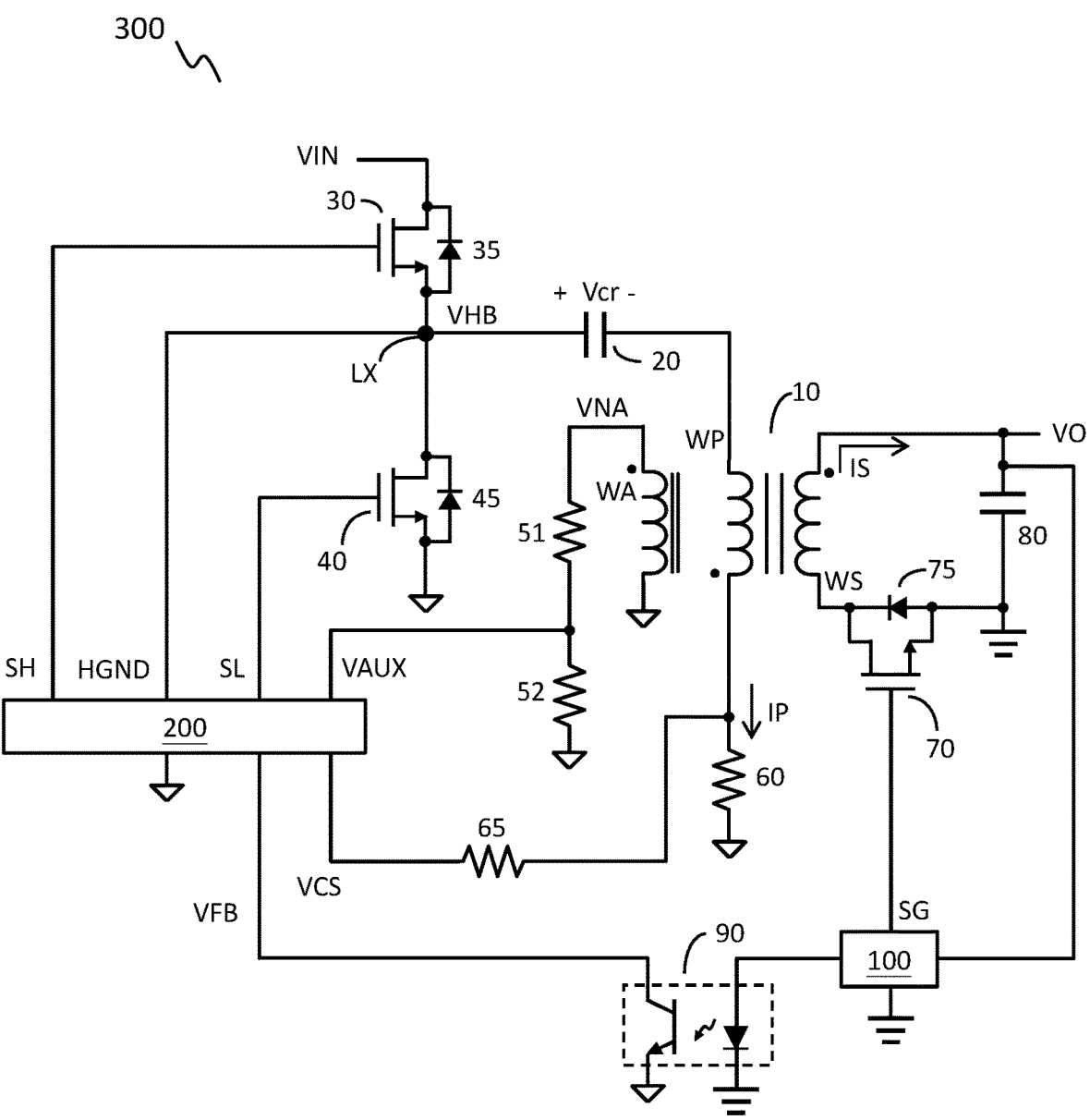
FIG. 2 shows a schematic diagram of a preferred embodiment of a resonant flyback power converter according to the present invention.

FIG. 2 shows a schematic diagram of a preferred embodiment of a resonant flyback power converter according to the present invention. The resonant AHB (asymmetrical half-bridge) flyback power converter 300 includes a first transistor 30 and a second transistor 40 which form a half-bridge circuit. A transformer 10 and a resonant capacitor 20 connected in series are coupled to the switching node LX of the half-bridge circuit. The transformer 10 includes a primary winding WP, a secondary winding WS and an auxiliary winding WA. The primary winding WP and the secondary winding WS have a turn ratio n=Np/Ns. The auxiliary winding WA and the secondary winding WS have a turn ratio m=Na/Ns. The auxiliary winding WA and the primary winding WP have a turn ratio k=Na/Np. Note that Np, Ns and Na are numbers of turns of the primary winding WP, the secondary winding WS and the auxiliary winding WA respectively.

A primary-side controller 200 is configured to generate a first driving signal SH and a second driving signal SL coupled to switch the transformer 10 through the half-bridge circuit for generating an output voltage VO at the secondary-side of the transformer 10. The first driving signal SH drives the first transistor 30 to magnetize the transformer 10. The second driving signal SL turns on the second transistor 40 during demagnetizing and the resonant period of the transformer 10. The second driving signal SL also is applied to turn on the second transistor 40 for generating a circulating current through the transformer 10 and achieving ZVS for the first transistor 30. A current-sense device (e.g., a resistor) 60 is coupled to generate a current-sense signal VCS by detecting a primary switching current IP of the power transformer 10.

The first driving signal SH and the second driving signal SL are generated in response to a feedback signal VFB according to the output power (e.g. output voltage VO) of the resonant flyback power converter 300. A secondary-side controller 100 is coupled to the output voltage VO for generating the feedback signal VFB. In one embodiment, the feedback signal VFB is coupled from the secondary-side controller 100 to the primary-side controller 200 through an opto-coupler 90. The secondary-side controller 100 also generates a driving signal SG for driving the synchronous rectifier 70 during the demagnetizing period TDS of the transformer 10. The auxiliary winding WA generates an auxiliary winding signal VNA during the switching of the transformer 10. Resistors 51, 52 further attenuate the auxiliary winding signal VNA for producing an auxiliary signal VAUX coupled to the primary-side controller 200.

Figure 3:
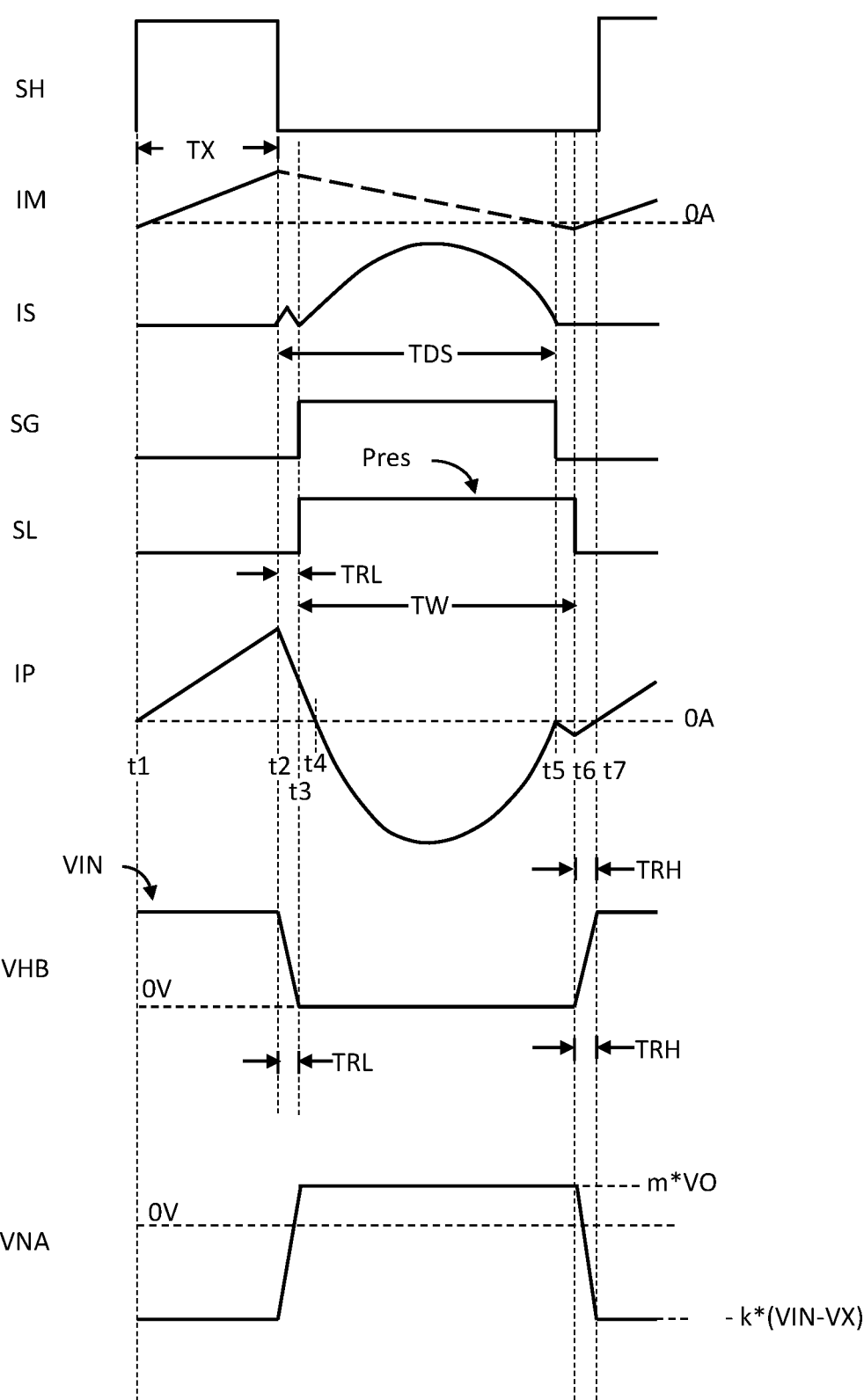
FIG. 3 shows operating waveforms corresponding to the resonant flyback power converter shown in FIG. 2 according to the present invention.

FIG. 3 shows operating waveforms corresponding to the embodiment shown in FIG. 2. The transformer 10 is magnetized and a magnetizing current IM is generated when the first driving signal SH is turned on (i.e. enabled to for example a high state). The transformer 10 is demagnetized when the first driving signal SH is turned off (i.e. disabled to for example a low state). The transformer 10 generates a secondary switching current IS during the demagnetizing period TDS. The resonant pulse-width TW of a resonant pulse Pres of the second driving signal SL is related to the demagnetizing period TDS of the transformer 10. In one embodiment, the resonant pulse-width TW of the second driving signal SL is configured to be equal to or longer than the demagnetizing period TDS of the transformer 10 to prevent the transformer 10 from operating in continuous conduction mode (CCM). A reflected voltage VX is generated in the resonant capacitor 20 during the demagnetizing period TDS of the transformer 10, wherein VX=n*VO=(Np/Ns)*VO.

The second driving signal SL can be turned on when the first driving signal SH is turned off. The first driving signal SH can be turned on when the second driving signal SL is turned off. Dead time periods (e.g. TRH and TRL) can be included in between the first driving signal SH and the second driving signal SL.

Operations during different time periods shown in FIG. 3 are explained in the following sections.

The period from t1 to t2 indicates a magnetized transformer cycle. The first transistor 30 is on and the second transistor 40 is off. The primary switching current IP increases in the transformer 10 and the voltage in the resonant capacitor 20 increases. The transformer 10 is magnetized and the resonant capacitor 20 is charged. The secondary synchronous rectifier 70 is off and the body diode 75 of the secondary synchronous rectifier 70 is biased inversely. Hence no energy is transferred to the secondary side.

The period from t2 to t3 indicates a first circulated current cycle. Both the first transistor 30 and the second transistor 40 are off. The circulated current of the transformer 10 forces the switching node voltage VHB of the half-bridge circuit to drop until the body diode 45 of the second transistor 40 is turned on. The time period from t2 to t3 is related to a quasi-resonant period for achieving ZVS of the second transistor 40. The primary side of the transformer 10 now has the same voltage as the resonant capacitor 20 at t3.

The period from t3 to t4 indicates a resonant cycle (positive current). The first transistor 30 is off and the second transistor 40 is turned on under the ZVS condition. The output voltage VO equals to the voltage Vcr across the resonant capacitor 20 divided by the turn ratio n. The current starts flowing through the secondary synchronous rectifier 70, the energy stored in the transformer 10 is transferred to the output to generate the output voltage VO. Because the LC tank is formed by the leakage inductance Lr of the transformer 10 and the resonant capacitor 20 (Cr), the secondary current follows a sine-wave with the period determined by the resonant frequency of Lr and Cr. The current in the primary side of the transformer 10 is the sum of the magnetizing current IM and the reflected secondary current IS. The current in the resonant tank (Lr, Cr) is still positive, mainly driven from the magnetizing inductance of the transformer 10, and flows into the resonant capacitor 20.

The period from t4 to t5 indicates a resonant cycle (negative current). The first transistor 30 is off and the second transistor 40 is turned on continuously. The energy is still being transferred to the secondary side, but the resonant tank current is inversely driven by the voltage in the resonant capacitor 20. The energy of the resonant capacitor 20 is not only transferred to the secondary side, but also utilized to bring the magnetizing current of the transformer 10 to a negative level when the second transistor 40 is continuously turned on (e.g. t4-t5).

The period from t5 to t6 indicates a backward magnetized transformer cycle (negative current). The backward magnetized transformer cycle is started from the end of demagnetizing period TDS of the transformer 10 to the second transistor 40 is off. The resonant capacitor 20 will inversely magnetize the transformer 10 and generate the negative current.

The period from t6 to t7 indicates a second circulated current cycle. Both the first transistor 30 and the second transistor 40 are off. The negative current induced in the transformer 10 during t5 to t6 forces the voltage VHB at the switching node LX of the half-bridge circuit to increase until it turns on the body diode 35 of the first transistor 30. Therefore, the first transistor 30 can achieve ZVS when turned on again at t7.

After the time point t7, another cycle starts similar with t1 to t2, wherein the first transistor 30 is turned on with the ZVS condition and the second transistor 40 is off. If the circulated current in the transformer resonant tank is still negative, the excess of energy in the tank will be sent back to the input VIN.

Figures 4A, 4B:
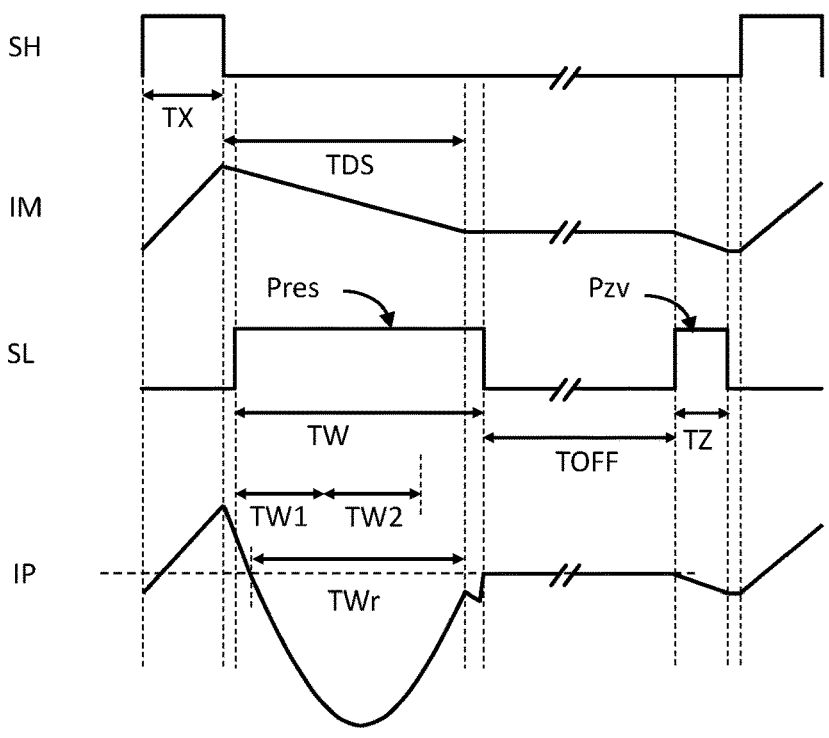
FIG. 4A shows waveforms of a preferred embodiment of the resonant flyback power converter operated in middle load according to the present invention.
FIG. 4B shows waveforms of a preferred embodiment of the resonant flyback power converter operated in a very light load or no output load according to the present invention.

FIG. 4A show waveforms of a preferred embodiment of the resonant flyback power converter operated in middle load according to the present invention. Referring to FIG. 4A, an off-time period TOFF is started from the turn-off of the second driving signal SL to the next turn-on of the second driving signal SL. The second driving signal SL will turn on once a timer 350' (shown in FIG. 9) is expired. In one embodiment, the off-time period TOFF and the period of the timer 350' are increased (the switching frequency is decreased) in response to the decrease of the output load for the power saving, wherein the output load is coupled to and consumes the output power. In one embodiment, during a middle load condition as shown in FIG. 4A, the demagnetizing period TDS is close to the resonant period TWr, and the resonant pulse-width TW of the second driving signal SL is close to both the demagnetizing period TDS and the resonant period TWr. Note that the demagnetizing period TDS is the time period of the magnetizing current IM falling from the peak to 0. The resonant period TWr is the resonant period of the resonant capacitor 20 and the leakage inductance of the transformer 10 plus the time period of the primary switching current IP falling from the peak to 0. The resonant pulse-width TW is a time period of the first pulse (i.e. the resonant pulse Pres) of the second driving signal SL after the first driving signal SH turning off.

In one embodiment, as shown in FIG. 4A, the resonant pulse-width TW of the second driving signal SL has a minimum resonant period Tres_min which is equal to the sum of a fixed minimum resonant sub-period TW1 and an adjustable minimum resonant sub-period TW2. In this embodiment in FIG. 4A, since the output load is during a middle range, the resonant pulse-width TW is not limited by the minimum resonant period Tres_min.

In one embodiment, the adjustable minimum resonant sub-period TW2 is decreased in response to the decrease of the output load. Therefore, the minimum resonant period Tres_min is also decreased in response to the decrease of the output load.

Referring to FIG. 4B, in one embodiment, during a very light output load or no output load condition, the resonant pulse-width TW is limited by the minimum resonant period Tres_min. In this embodiment as shown in FIG. 4B, the adjustable minimum resonant sub-period TW2 is adjusted to be 0 as the output load further decreases. Thus, the resonant pulse-width TW in FIG. 4B is equal to the fixed minimum resonant sub-period TW1.

From one perspective, a first minimum resonant period Tres_min1 during a higher output load condition is Tres_min1=TW1+TW2, wherein the TW2 is non-zero, is longer than a second minimum resonant period Tres_min2 during a lower output load condition is Tres_min2=TW1+0 when TW2 is zero.

Figure 5:
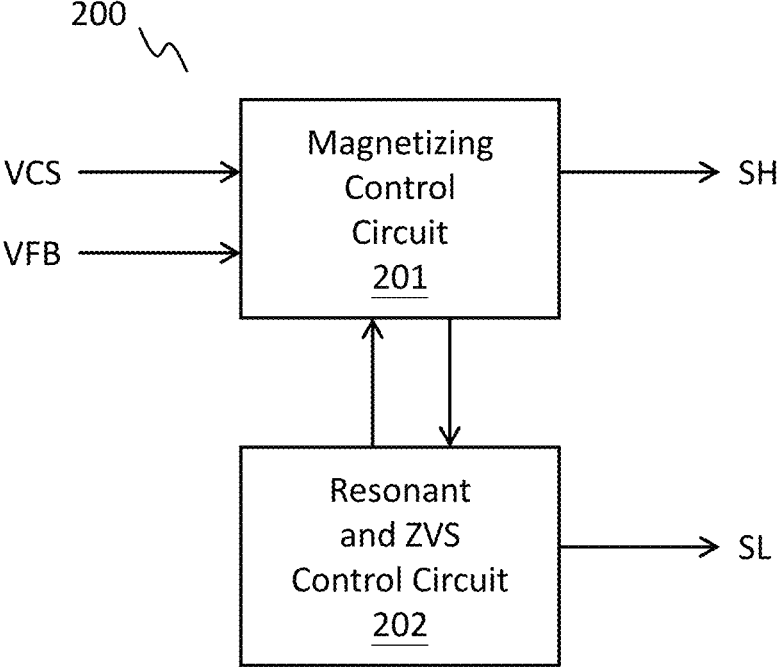
FIG. 5 shows a block diagram of a preferred embodiment of the primary-side controller of the resonant flyback power converter according to the present invention.

FIG. 5 shows a block diagram of a preferred embodiment of the primary-side controller (200) of the resonant flyback power converter according to the present invention. In one embodiment, as shown in FIG. 5, the primary-side controller 200 includes a magnetizing control circuit 201 and a resonant and ZVS control circuit 202. The magnetizing control circuit 201 is configured to generate the first driving signal SH according to the current-sense signal VCS, the feedback signal VFB and signals generated by the resonant and ZVS control circuit 202. The resonant and ZVS control circuit 202 is configured to generate the second driving signal SL according to signals generated by the magnetizing control circuit 201.

Figure 6A:
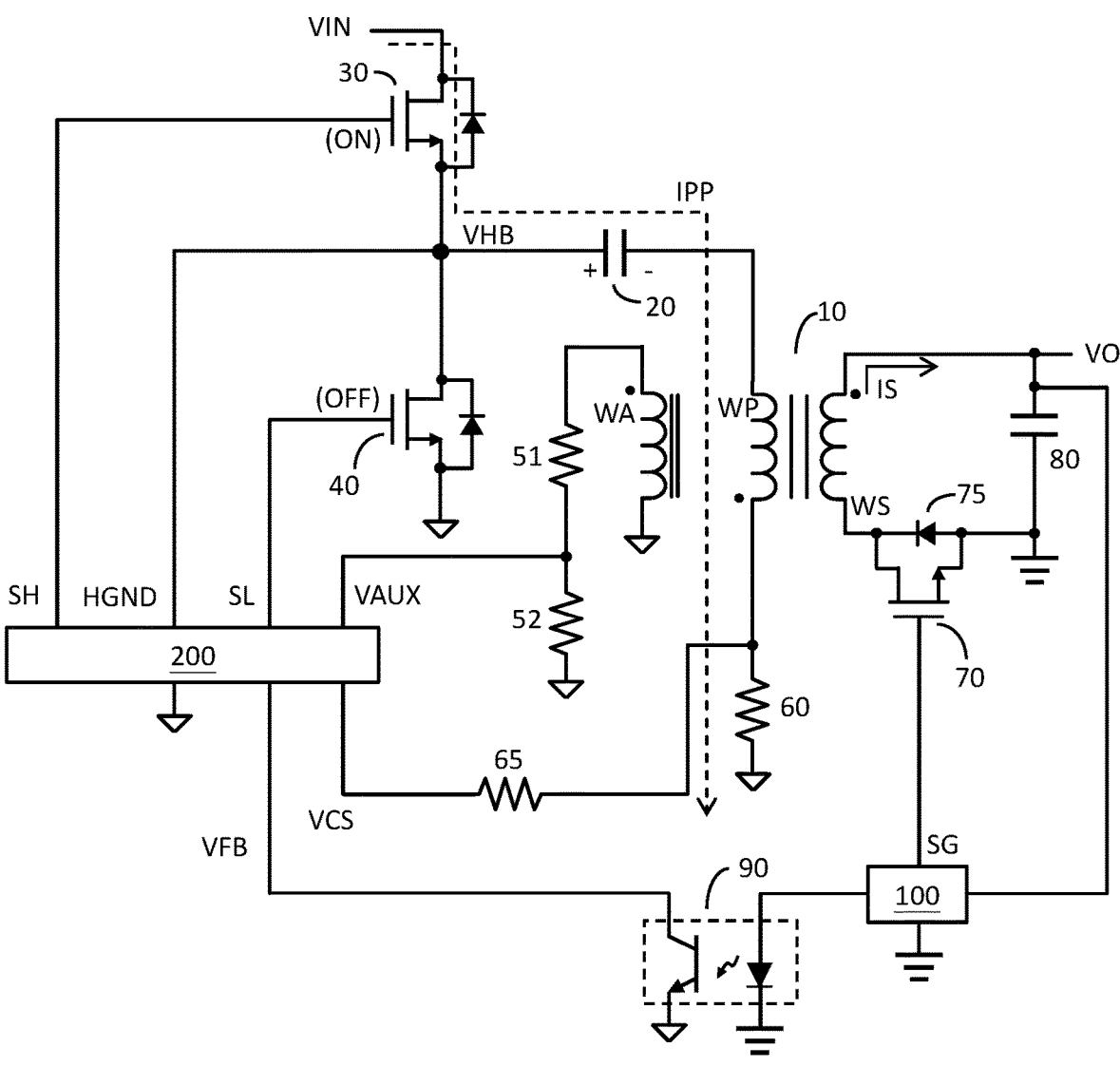
FIG. 6A shows a schematic diagram of a preferred embodiment of a resonant flyback power converter operated in the magnetized transformer cycle with a positive primary switching current according to the present invention.

FIG. 6A shows a schematic diagram of a preferred embodiment of the AHB flyback power converter operated in the magnetized transformer cycle with a positive primary switching current according to the present invention. FIG. 6A shows the positive current IPP which is the positive portion of the primary switching current IP. The positive current IPP is generated when the first transistor 30 is turned on and the second transistor 40 is off, and the power converter is operated in the magnetized transformer cycle (positive current IPP, corresponding to the period of "t1 to t2" of FIG. 3). The positive current IPP will magnetize the transformer 10 and charge the resonant capacitor 20. If the output of the resonant flyback power converter is short-circuited at this moment, the magnetic-flux of the transformer 10 will saturate after a few switching cycles, and the primary winding WP of the transformer 10 will be equivalently short-circuited, which can cause a permanent damage to the first transistor 30. Therefore, an over-current protection is required to turn off the first transistor 30 immediately for protecting the first transistor 30 when the positive current IPP of the primary switching current IP exceeds a positive-over-current threshold.

Figure 6B:
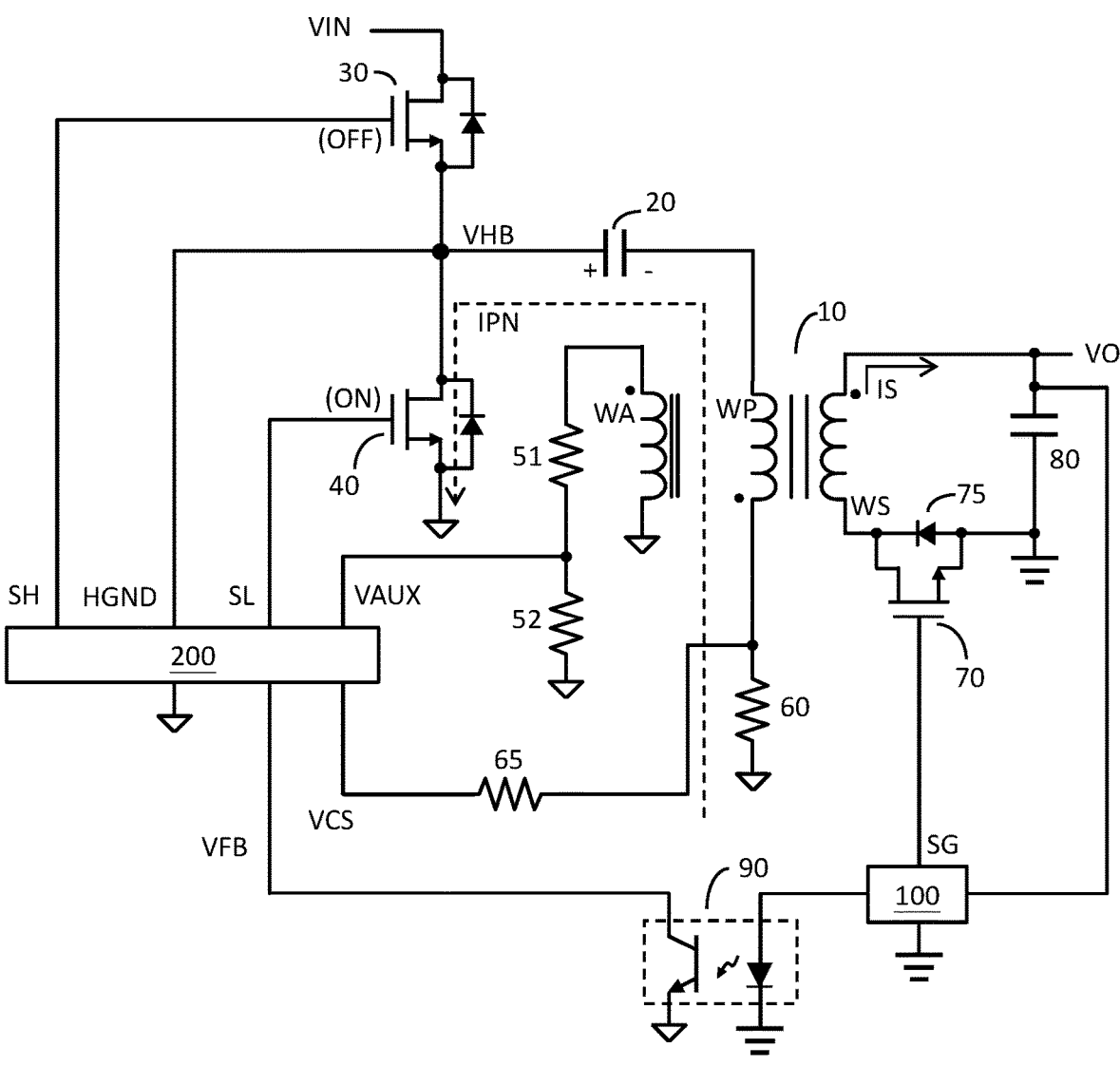
FIG. 6B shows a schematic diagram of a preferred embodiment of a resonant flyback power converter operated in the resonant cycle with a negative primary switching current according to the present invention.

FIG. 6B shows a schematic diagram of a preferred embodiment of the resonant flyback power converter operated in the resonant cycle with a negative primary switching current according to the present invention. FIG. 6B shows the negative current IPN which is the negative portion of the primary switching current IP. The negative current IPN is generated when the first transistor 30 is off and the second transistor 40 is turned on, and the power converter is operated in the resonant cycle (negative current, corresponding to the period of "t4 to t5" of FIG. 3). The energy of the resonant capacitor 20 is transferred to the output of the resonant flyback power converter through the transformer 10. If the output of the resonant flyback power converter is zero-volt or short-circuited at this moment, the resonant capacitor 20 will be equivalently short-circuited through the transformer 10, which can cause a very high switching current stress to the second transistor 40 and may lead to permanent damage. Therefore, an over-current protection is needed to turn off the second transistor 40 immediately for protecting the second transistor 40 from permanent damage when the negative current IPN exceeds a negative-over-current threshold. However, this high switching current stress might cause a short life time (reliability) issue for the second transistor 40.

Over-current protection schemes during normal switching conversion operation can be seen in for example the parent patent of the continuation in part application. Over-current protection schemes during power-on are proposed herein.

Figure 7:
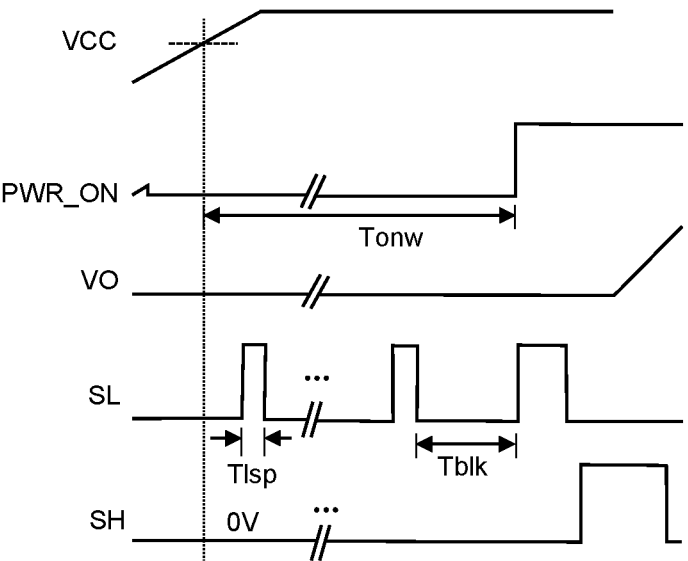
FIG. 7 shows a preferred waveform of the power-on control method according to the present invention.

FIG. 7 shows a preferred waveform of the power-on control method according to the present invention. When the power VCC of the resonant flyback power converter 300 is turned on (e.g. power voltage VCC>Vth_por), the primary-side controller 200 will generate a power-on signal PWR_ON (low-true) to control the feedback loop of the resonant flyback power converter 300 into open-looped. During the power-on period Tonw of the power-on signal PWR_ON, the primary-side controller 200 will generate a plurality of short-pulses of the second driving signal SL to turn on the second transistor 40 shortly for discharging the resonant capacitor 20. In one embodiment, the short-pulses of the second driving signal SL are also configured for charging a bootstrap capacitor 242. The bootstrap capacitor 242 provides the power source for the high-side gate driver 240.

In one embodiment, the pulse-width Tlsp of the short-pulses of the second driving signal SL is short to an extent that the negative current IPN of the second transistor 40 does not exceed a current limit threshold (e.g. the negative-over-current threshold) during the period Tonw of the power-on signal PWR_ON for preventing damage during power-up. In one preferred embodiment, the pulse-width Tlsp of the short-pulses of the second driving signal SL is less than fps. The first driving signal SH and the first transistor 30 are turned off during the period Tonw of the power-on signal PWR_ON.

Figure 8:
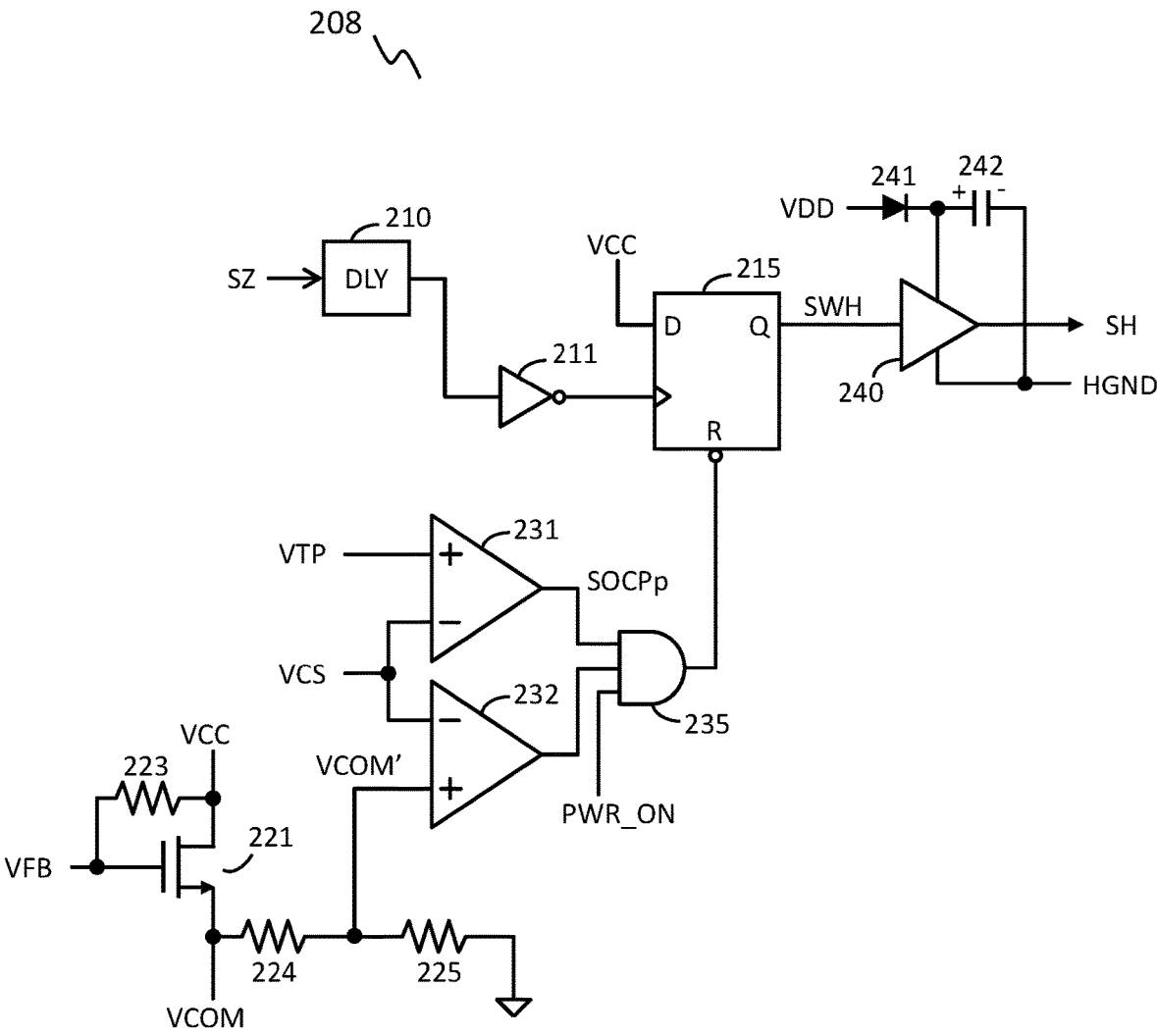
FIG. 8 shows a schematic diagram of a preferred embodiment of a magnetizing control circuit of the resonant flyback power converter according to the present invention.

FIG. 8 shows a schematic diagram of a preferred embodiment of a magnetizing control circuit 208, for generating the first driving signal SH, of the resonant flyback power converter according to the present invention.

The feedback signal VCOM is a level-shifted signal of the feedback signal VFB via a transistor 221. In one embodiment, the level of the feedback signal VFB is proportional to the level of the output load of the resonant flyback power converter. The falling edge of a ZVS control signal SZ enables a flip-flop 215 and the first driving signal SH after a delay time provided by a delay cell 210, wherein the generation of the ZVS control signal SZ will be explained in detail later. In one embodiment, the delay time provided by the delay cell 210 is related to a quasi-resonant delay for ZVS, wherein the quasi-resonant delay is related to the resonant period of the magnetizing inductance of the primary winding WP and the total equivalent parasitic capacitance on the switching node LX.

Resistors 224, 225 generates an attenuated feedback signal VCOM'. A comparator 232 resets the flip-flop 215 and is configured to turn off the first driving signal SH when the current-sense signal VCS is higher than the attenuated feedback signal VCOM'. The output of the flip-flop 215 (i.e. the first switching control signal SWH) generates the first driving signal SH through the high-side gate driver 240. The bootstrap capacitor 242 and a bootstrap diode 241 are configured to provide the power source for the high-side gate driver 240.

The magnetizing control circuit 208 further includes a comparator 231, and an AND gate 235. The comparator 231 will generate a positive-over-current protection signal SOCPp to reset the flip-flop 215 and turn off the first driving signal SH through the AND gate 235 when the level of the current-sense signal VCS exceeds the first current threshold voltage VTP. The power-on signal PWR_ON is connected to the AND gate 235 to reset the flip-flop 215 and turned off the first driving signal SH during the period TONW of the power-on signal PWR_ON.

Figure 9:
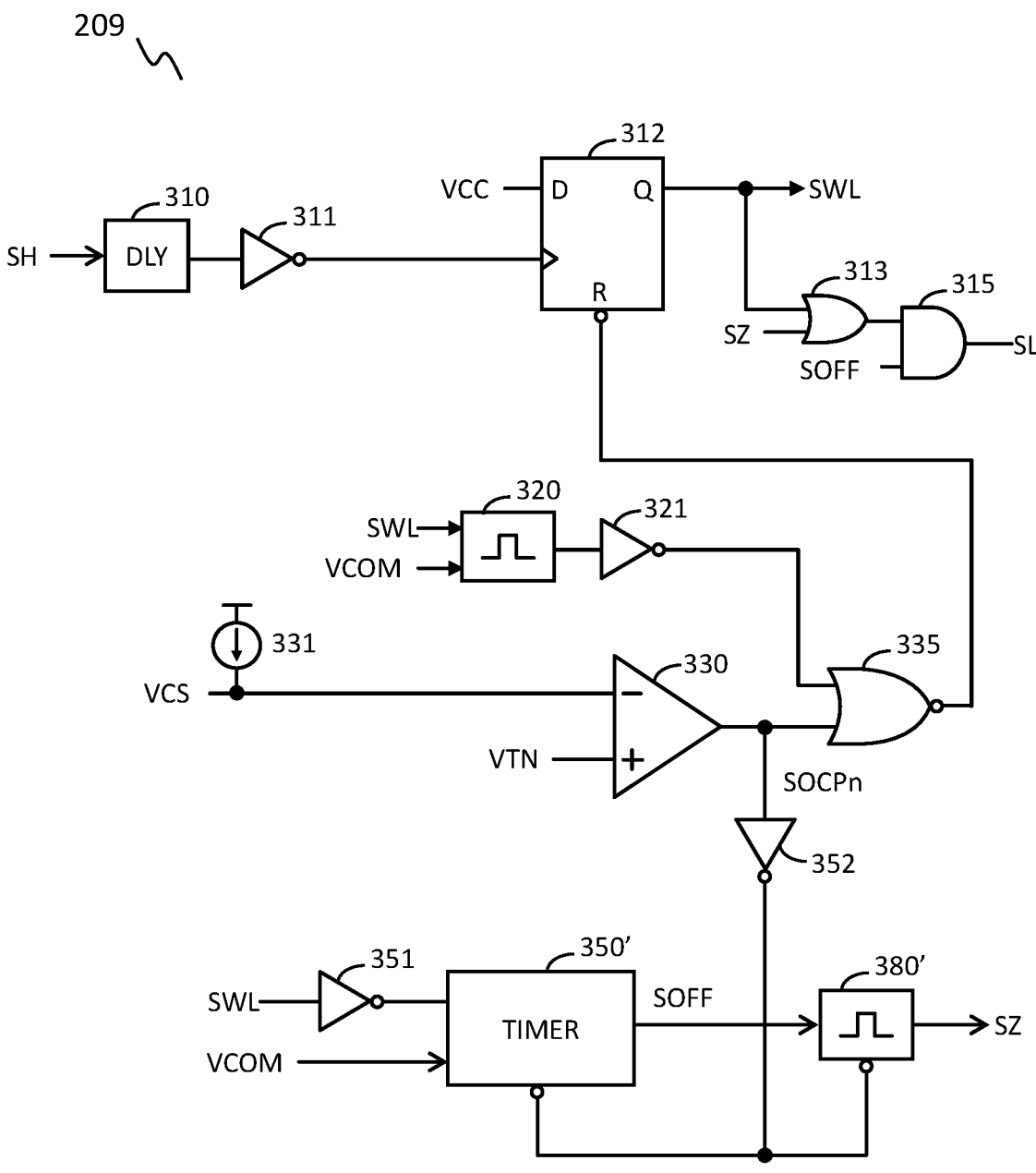
FIG. 9 shows a schematic diagram of a preferred embodiment of a resonant and ZVS control circuit of the resonant flyback power converter according to the present invention.

FIG. 9 shows a schematic diagram of a preferred embodiment of a resonant and ZVS control circuit 209, for generating the second driving signal SL, of the resonant flyback power converter according to the present invention. The second driving signal SL is formed by a second switching control signal SWL (with the resonant pulse-width TW) and a ZVS control signal SZ (with a ZVS pulse-width TZ). The second driving signal SL is generated via an OR gate 313 and an AND gate 315 which are configured for processing the signals SWL, SZ and SOFF. Note that the signal SOFF generated by the timer 350' is configured to represent the aforementioned off-time period TOFF as shown in FIG. 4A and FIG. 4B and to assure both the first driving signal SH (FIG. 8) and the second driving signal SL (FIG. 9) are off during the off-time period TOFF.

Still referring to FIG. 9, the falling edge of the first driving signal SH triggers a flip-flop 312 to enable the second switching control signal SWL after a quasi-resonant delay provided by a delay-time cell 310. In a preferred embodiment, the delay-time cell 310 is configured to provide a quasi-resonant delay for ZVS of the second transistor 40. Once the second switching control signal SWL is enabled, a pulse generator 320 determines the pulse-width of the second switching control signal SWL (i.e. the resonant pulse-width TW) according to the level of the feedback signal VCOM. The pulse-width of the second switching control signal SWL is decreased in response to the decrease of the output load. The end of the pulse of the pulse generator 320 will generate a reset signal to reset the flip-flop 312 and turn off the second switching control signal SWL, which corresponds to the starting of the aforementioned off-time period TOFF. A current source 331 associated with the resistor 65 (e.g. FIG. 6B) provide a bias voltage to the current-sense signal VCS. A comparator 330 is coupled to receive the current-sense signal VCS and generate a negative-over-current protection signal SOCPn when the level of the current-sense signal VCS exceeds the second current threshold voltage VTN. The negative-over-current protection signal SOCPn is coupled to reset the flip-flop 312, the timer 350' and the pulse generator 380', which assures to the turn-off of the second driving signal SL through the AND gate 315 for the negative-over-current protection.

The turn-off of the second switching control signal SWL (e.g. low state) starts the timer 350' and generate the off-time signal SOFF (a low-true signal). In one preferred embodiment, the off-time period TOFF of the timer 350' is inverse proportional to the level of the feedback signal VCOM. During the DCM operation, the off-time period TOFF is increased (such that the switching frequency is decreased) in response to the decrease of the output load. Once the timer 350' is expired, the timer 350' enables the pulse generator 380' to generate the ZVS control signal SZ. During the heavy load, the off-time period TOFF of the timer 350' is zero. A predetermined off-time period is generated when the timer 350' is reset by the negative-over-current protection signal SOCPn. During the DCM operation, the ZVS control signal SZ is utilized to generate a circulated current for achieving the ZVS of the first transistor 30.

Referring back to FIGS. 4A and 4B, in one embodiment, the pulse-width TX of the first driving signal SH is decreased in response to the decrease of the output load. The pulse-width TW of the second driving signal SL is also decreased according to the decrease of the pulse-width TX of the first driving signal SH. However, the second driving signal SL still has a minimum on-time that is needed to discharge the resonant capacitor 20. In one embodiment, for both the middle load and the light load operations, the second driving signal SL (the second switching control signal SWL or the ZVS control signal SZ) is turned off as long as the current-sense signal VCS exceeds the second current threshold voltage VTN. The first driving signal SH and the second driving signal SL are also turned off for a predetermined off-time period when the level of the negative current IPN exceeds the negative-over-current threshold.

In summary, the first driving signal SH and the second driving signal SL are coupled to switch the first transistor 30 and the second transistor 40 respectively. The first transistor

30 and the second transistor 40 develop the half-bridge circuit coupled to switch the transformer 10 through the resonant capacitor 20 and the current-sense device 60 for generating the output voltage VO. The turn-on of the first driving signal SH generates the positive current IPP of the primary switching current IP to magnetize the transformer 10 and charge the resonant capacitor 20. The turn-on of the second driving signal SL generates the negative current IPN of the primary switching current IP to discharge the resonant capacitor 20. The first transistor 30 is turned off once the level of the positive current IPP exceeds the positive-over-current threshold. The second transistor 40 is turned off once the level of the negative current IPN exceeds the negative-over-current threshold. In one embodiment, the current-sense device 60 is a current-sense resistor. The current-sense resistor is coupled to detect the level of the positive current IPP and the level of the negative current IPN of the primary switching current IP. The positive current IPP and the negative current IPN are in inverse polarity. The resistor 65 and the current source 331 are coupled to the current-sense device 60 for generating the current-sense signal VCS. The current-sense signal VCS is further coupled to be compared with the first current threshold voltage VTP and the second current threshold voltage VTN.

Figure 10:
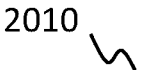
FIG. 10 illustrates a preferred embodiment of the circuit for generating the second driving signal according to the present invention.

Refer to FIG. 7 and FIG. 10. FIG. 10 shows another preferred embodiment of the resonant and ZVS control circuit 2010, for generating the second driving signal SL, of the resonant flyback power converter according to the present invention. The resonant and ZVS control circuit 2010 is similar to the resonant and ZVS control circuit 209. In this embodiment, as shown in FIG. 10, the second driving signal SL is formed by a second switching control signal SWL (with the resonant pulse-width TW) and a pulse signal PLS (with a pulse-width Tlsp). The second driving signal SL is generated via an OR gate 313'. The falling edge of the first driving signal SH will turn on a flip-flop 312 and generate the second switching control signal SWL after a delay-time cell 310 (a quasi-resonant delay for ZVS). In this embodiment, when the resonant flyback power converter 300 is turned on, the power-on signal PWR_ON is configured to generate a signal PON configured to reset the flip-flop 312 (through the NOR gate 335') and control the feedback loop of the resonant flyback power converter 300 to be open-looped during power-on. The power-on signal PWR_ON is further configured to control a counter 353 for generating a plurality of trigger signals coupled to the pulse generator 381' to generate plural pulses of the pulse signal PLS. In one embodiment, the pulse-width Tlsp of the pulse signal PLS is less than 1 µs. Note that the signal PON is an inverting signal of the power-on signal PWR_ON.

Note that a time length Tblk of a blank time between two consecutive ones of the short-pulses of the second driving signal SL is counted by the counter 353. In one embodiment, the time length Tblk of a blank time is long to an extent that the negative current IPN does not exceed a current limit threshold.

Figure 11:
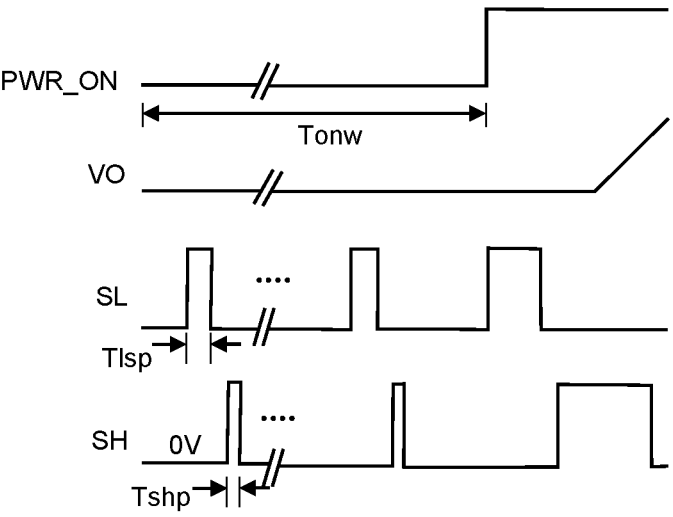
FIG. 11 illustrates another preferred waveform of the power-on control method according to the present invention.

FIG. 11 shows another preferred waveform of the power-on control method according to the present invention. When the power of the resonant flyback power converter 300 is turned on, the primary-side controller 200 generates the power-on signal PWR_ON (low-true) to control the feedback loop of the resonant flyback power converter 300 to be open-looped. During the enable of the power-on signal PWR_ON (e.g. low state), the primary-side controller 200 is configured to generate a plurality of short-pulses of the second driving signal SL to turn on the second transistor 40 shortly for discharging the resonant capacitor 20 and charging a bootstrap capacitor 242. After the second driving signal SL (the short pulse) is turned off, a minimum on-time Tshp of the first driving signal SH is generated to turn on the first transistor 30 with the minimum on-time.

Figure 12:
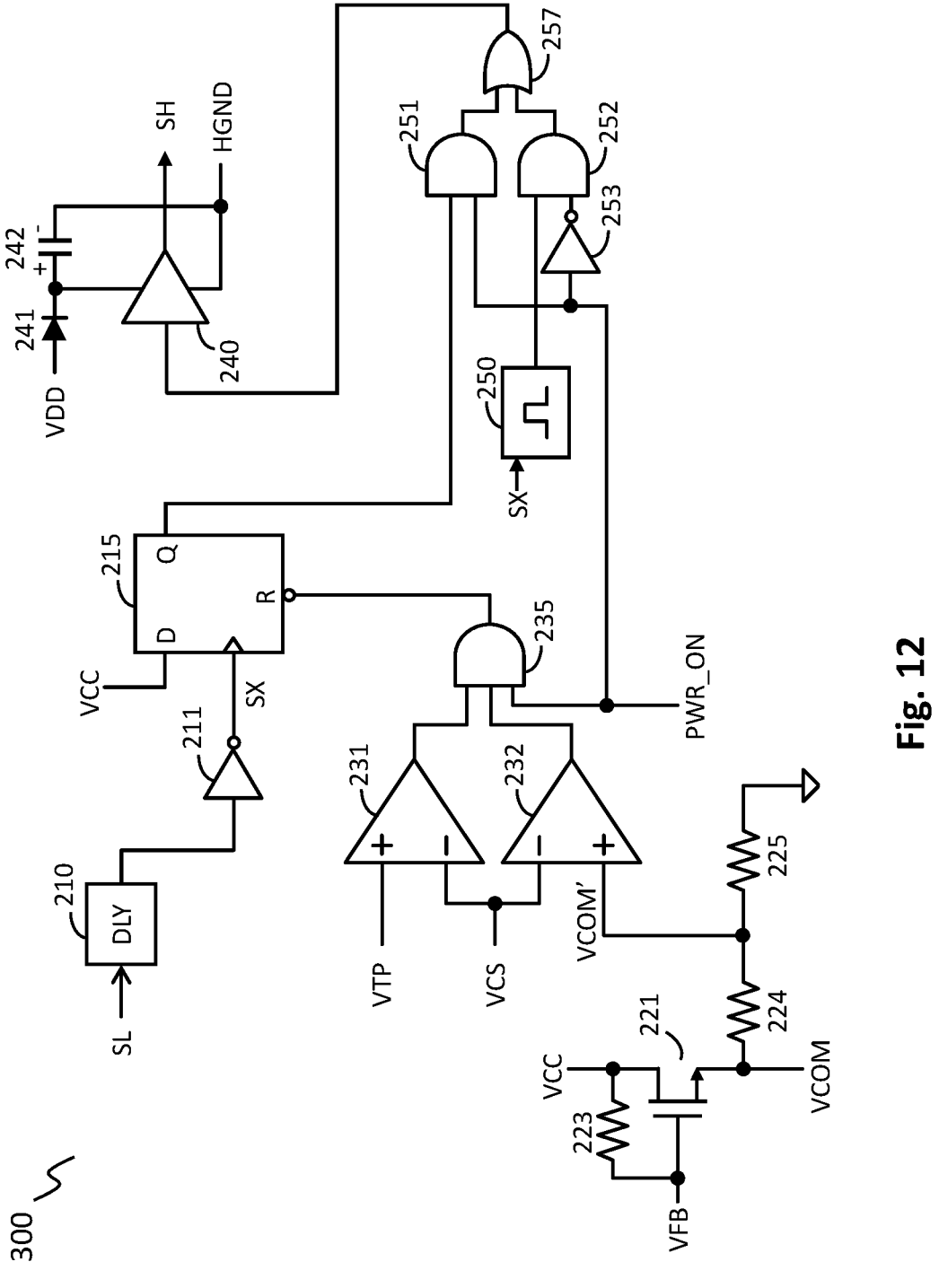
FIG. 12 illustrates another preferred embodiment of the circuit for generating the first driving signal SH according to the waveform shown in FIG. 11.

FIG. 12 is another preferred embodiment of the magnetizing control circuit 2012, for generating the first driving signal SH corresponding to the waveforms shown in FIG. 11, of the resonant flyback power converter according to the present invention. The magnetizing control circuit 2012 is similar to the magnetizing control circuit 208. In this embodiment, as shown in FIG. 12, after the second driving signal SL is turned off (represented by the signal SX), the minimum on-time Tshp of the first driving signal SH is generated by a pulse generator 250 triggered by the signal SX. An inverter 253, AND gates 251, 252 and an OR gate 257 are configured as a multiplexer. This multiplexer enables the minimum on-time Tshp of the first driving signal SH during the period of the power-on signal PWR_ON. After the power-on signal PWR_ON is disabled (e.g. high state), the output of the flip-flop 215 is selected to generate the first driving signal SH through the high-side gate driver 240.

Note that from one perspective, the switching control circuit of the present invention includes a feedback circuit which includes sub-circuits across for example the magnetizing control circuit 208 shown in FIG. 8 and the resonant and ZVS control circuit 2010 shown in FIG. 10, such as the level shifter generating the feedback signals VCOM and VCOM', the comparator 232 for achieving the peak current control, the pulse generator 320 for determining the pulse-width of the second switching control signal SWL (i.e. the resonant pulse-width TW) according to the level of the feedback signal VCOM. The feedback loop of the feedback circuits is controlled to operate in closed-loop during normal conversion after power-on. On the other hand, during the power-on period, the power-on signal PWR_ON controls the feedback loop of the feedback circuits to be open-looped. And the second driving signal SL is controlled to switch with short-pulses as describe previously. The first driving signal SH is controlled to be off or to switch with minimum on-time when the feedback loop is open-looped during the power-on period.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching control circuit for use in controlling a resonant flyback power converter which includes a first transistor and a second transistor which form a half-bridge circuit; and a transformer and a resonant capacitor which are connected in series and are coupled to the half-bridge circuit, wherein the half-bridge circuit is configured to switch the transformer and the resonant capacitor to generate an output voltage; wherein the switching control circuit comprises:
   a magnetizing control circuit, configured to operably generate a first driving signal to switch the first transistor; and
   a resonant and Zero Voltage Switching (ZVS) control circuit, coupled to the magnetizing control circuit and configured to operably generate a second driving signal to switch the second transistor;
   wherein the switching control circuit is configured to turn on the first transistor to generate a first current to magnetize the transformer and charge the resonant capacitor, and is configured to turn on the second transistor to generate a second current to discharge the resonant capacitor;
   wherein during a power-on period of the resonant flyback power converter, the switching control circuit generates a plurality of short-pulses of the second driving signal to turn on the second transistor for discharging the resonant capacitor.

2. The switching control circuit as claimed in claim 1, wherein a pulse-width of the short-pulses of the second driving signal is short to an extent that the second current does not exceed a current limit threshold.

3. The switching control circuit as claimed in claim 2, wherein the pulse-width of the short-pulses of the second driving signal is less than 1 µs.

4. The switching control circuit as claimed in claim 1, wherein the first driving signal is turned off during the power-on period of the resonant flyback power converter.

5. The switching control circuit as claimed in claim 1, wherein the switching control circuit further includes a feedback circuit to control the first driving signal and the second driving signal for regulating the output voltage; wherein a feedback loop of the feedback circuit is controlled to be open-looped during the power-on period of the resonant flyback power converter.

6. The switching control circuit as claimed in claim 1, wherein the first driving signal and the second driving signal are turned off when a level of the second current is over a negative-over-current threshold.

7. The switching control circuit as claimed in claim 1, wherein the first current and the second current are in inverse polarity.

8. The switching control circuit as claimed in claim 2, wherein a blank time between two consecutive ones of the short-pulses is long to an extent that the second current does not exceed the current limit threshold.

9. The switching control circuit as claimed in claim 8, wherein the switching control circuit further includes a counter configured to count the blank time.

10. The switching control circuit as claimed in claim 1, wherein the first driving signal is turned on with a minimum pulse-width after turning-off of at least one of the short-pulses of the second driving signal during the power-on period of the resonant flyback power converter.

11. The switching control circuit as claimed in claim 2, wherein the pulse-width of the short-pulses of the second driving signal is related to a capacitance of the resonant capacitor, a capacitance of an output capacitor, and/or a Safe Operating Area (SOA) of the second transistor.

12. The switching control circuit as claimed in claim 1, wherein the short-pulses of the second driving signal are further configured to charge a bootstrap capacitor, wherein the bootstrap capacitor is configured to provide a power source to a high-side gate driver for generating the first driving signal to drive the first transistor.

13. A resonant flyback power converter, comprising:
a first transistor and a second transistor which form a half-bridge circuit;
a transformer and a resonant capacitor which are connected in series and are coupled to the half-bridge circuit; and
a switching control circuit configured to operably generate a first driving signal and a second driving signal to control the first transistor and the second transistor respectively for switching the transformer and the resonant capacitor to generate an output voltage;
wherein the switching control circuit is configured to turn on the first transistor to generate a first current to magnetize the transformer and charge the resonant capacitor, and is configured to turn on the second transistor to generate a second current to discharge the resonant capacitor;
wherein during a power-on period of the resonant flyback power converter, the switching control circuit generates a plurality of short-pulses of the second driving signal to turn on the second transistor for discharging the resonant capacitor.

14. The resonant flyback power converter as claimed in claim 13, wherein a pulse-width of the short-pulses of the second driving signal is short to an extent that the second current does not exceed a current limit threshold.

15. The resonant flyback power converter as claimed in claim 14, wherein the pulse-width of the short-pulses of the second driving signal is less than 1 μs.

16. The resonant flyback power converter as claimed in claim 13, wherein the switching control circuit further includes a feedback circuit to control the first driving signal and the second driving signal for regulating the output voltage; wherein a feedback loop of the feedback circuit is controlled to be open-looped during the power-on period of the resonant flyback power converter.

17. The resonant flyback power converter as claimed in claim 13, wherein the first driving signal and the second driving signal are turned off when a level of the second current is over a negative-over-current threshold.

18. The resonant flyback power converter as claimed in claim 13, wherein the first driving signal is turned on with a minimum pulse-width after turning-off of at least one of the short-pulses of the second driving signal during the power-on period of the resonant flyback power converter.

19. The resonant flyback power converter as claimed in claim 13, wherein the short-pulses of the second driving signal are further configured to charge a bootstrap capacitor, wherein the bootstrap capacitor is configured to provide a power source to a high-side gate driver for generating the first driving signal to drive the first transistor.

20. A method for use in controlling a resonant flyback power converter which includes a first transistor and a second transistor which form a half-bridge circuit; and a transformer and a resonant capacitor which are connected in series and are coupled to the half-bridge circuit, wherein the half-bridge circuit is configured to switch the transformer and the resonant capacitor to generate an output voltage; wherein the method comprises:
generating a first driving signal which is configured to turn on the first transistor to generate a first current to magnetize the transformer and charge the resonant capacitor; and
generating a second driving signal which is configured to turn on the second transistor to generate a second current to discharge the resonant capacitor;
wherein during a power-on period of the resonant flyback power converter, the second driving signal includes a plurality of short-pulses configured to turn on the second transistor for discharging the resonant capacitor.

21. The method as claimed in claim 20, wherein a pulse-width of the short-pulses of the second driving signal is short to an extent that the second current does not exceed a current limit threshold.

22. The method as claimed in claim 21, wherein the pulse-width of the short-pulses of the second driving signal is less than 1 μs.

23. The method as claimed in claim 20, further comprising:
forming a feedback loop to control the first driving signal and the second driving signal for regulating the output voltage; and
controlling the feedback loop to be open-looped during the power-on period of the resonant flyback power converter.

24. The method as claimed in claim 20, further comprising: turning off the first driving signal and the second driving signal when a level of the second current is over a negative-over-current threshold.

25. The method as claimed in claim 20, further comprising: turning on the first driving signal with a minimum pulse-width after turning-off of at least one of the short-pulses of the second driving signal during the power-on period of the resonant flyback power converter.

26. The method as claimed in claim 20, further comprising: charging a bootstrap capacitor according to the short-pulses of the second driving signal, wherein the bootstrap capacitor is configured to provide a power source to a high-side gate driver for generating the first driving signal to drive the first transistor.

* * * * *